US012731600B2

(12) United States Patent
Chopra et al.

(10) Patent No.: US 12,731,600 B2
(45) Date of Patent: Sep. 8, 2026

(54) METHOD AND DEVICE FOR MANAGING AUDIO BASED ON SPECTROGRAM

(71) Applicant: SAMSUNG ELECTRONICS CO., LTD., Suwon-si (KR)

(72) Inventors: Ashish Chopra, Noida (IN); Rahil Choudhary, Noida (IN); Apoorv, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 18/189,545

(22) Filed: Mar. 24, 2023

(65) Prior Publication Data

US 2023/0230611 A1 Jul. 20, 2023

Related U.S. Application Data

(63) Continuation of application No. PCT/KR2023/000222, filed on Jan. 5, 2023.

(30) Foreign Application Priority Data

Jan. 5, 2022 (IN) ............................ 202241000585

(51) Int. Cl.
*H04R 1/10* (2026.01)
*G10H 1/00* (2006.01)
(Continued)

(52) U.S. Cl.
CPC ........... *G10L 25/18* (2013.01); *G10H 1/0008* (2013.01); *G10L 21/0208* (2013.01);
(Continued)

(58) Field of Classification Search
None
See application file for complete search history.

(56) References Cited

U.S. PATENT DOCUMENTS 6,336,092 B1 1/2002 Gibson et al.
6,615,174 B1 9/2003 Arslan et al.
(Continued)

FOREIGN PATENT DOCUMENTS

CN 111210850 5/2020
CN 111724812 9/2020
(Continued)

OTHER PUBLICATIONS

Extended European Search Report dated Oct. 15, 2024 issued in European Patent Application No. 23737401.2.
(Continued)

*Primary Examiner* — Pierre Louis Desir
*Assistant Examiner* — Kristen Michelle Masters
(74) *Attorney, Agent, or Firm* — Nixon & Vanderhye P.C.

(57) ABSTRACT

Various embodiments herein provide a method for managing an audio based on a spectrogram. The method includes generating, by a transmitter device, the spectrogram of the audio. The method includes identifying a first spectrogram corresponding to vocals in the audio and a second spectrogram corresponding to music in the audio from the spectrogram of the audio, and extracting a music feature from the second spectrogram. The method includes transmitting a signal comprising the first spectrogram, the second spectrogram, the music feature and the audio to a receiver device. The method includes determining, by the receiver device, whether an audio drop is occurring in the received signal based on a parameter associated with the received signal. The method includes generating the audio using the first spectrogram, the second spectrogram, the music feature, in response to determining that the audio drop is occurring in the received signal.

11 Claims, 18 Drawing Sheets

(51) Int. Cl.

| | |
|---|---|
| ***G10L 19/005*** | (2013.01) |
| ***G10L 21/0208*** | (2013.01) |
| ***G10L 25/18*** | (2013.01) |
| ***G10L 25/30*** | (2013.01) |
| ***H04R 3/00*** | (2006.01) |

(52) U.S. Cl.

CPC ........ *G10L 25/30* (2013.01); *G10H 2210/031* (2013.01); *G10H 2250/311* (2013.01)

(56) References Cited

U.S. PATENT DOCUMENTS

| | | | | |
|---|---|---|---|---|
| 8,452,884 | B2 * | 5/2013 | Wang | H04N 21/647 709/219 |
| 9,113,240 | B2 | 8/2015 | Ramakrishnan et al. | |
| 9,584,940 | B2 | 2/2017 | Tsilfidis et al. | |
| 10,008,193 | B1 | 6/2018 | Harvilla | |
| 10,354,632 | B2 * | 7/2019 | Deif | G10H 1/366 |
| 10,511,908 | B1 | 12/2019 | Fisher | |
| 10,885,894 | B2 | 1/2021 | Nam et al. | |
| 10,891,928 | B2 | 1/2021 | Luan et al. | |
| 12,087,268 | B1 * | 9/2024 | Ouyang | G10L 13/02 |
| 2005/0016360 | A1 * | 1/2005 | Zhang | G10H 1/0033 84/600 |
| 2012/0269354 | A1 * | 10/2012 | Doherty | G10L 19/005 381/56 |
| 2016/0189731 | A1 * | 6/2016 | Hennequin | G10L 21/0364 381/66 |
| 2018/0122403 | A1 | 5/2018 | Koretsky et al. | |
| 2018/0374461 | A1 | 12/2018 | Serletic et al. | |
| 2019/0392802 | A1 | 12/2019 | Higurashi | |
| 2021/0120355 | A1 | 4/2021 | Kim et al. | |
| 2022/0238087 | A1 * | 7/2022 | Steffensen | G06N 3/096 |
| 2023/0306943 | A1 * | 9/2023 | Zheng | G10L 21/06 |
| 2024/0031841 | A1 * | 1/2024 | Borsos | G06N 20/20 |

FOREIGN PATENT DOCUMENTS

| | | | |
|---|---|---|---|
| DE | 69826446 | T2 | 1/2005 |
| JP | 2010-210758 | | 9/2010 |
| KR | 102168529 | B1 | 10/2020 |
| KR | 10-2021-0068774 | | 6/2021 |
| KR | 10-2021-0107943 | | 9/2021 |

OTHER PUBLICATIONS

Wang et al., "A Drumbeat-Pattern Based Error Concealment Method For Music Streaming Applications", IEEE, 2002, 4 pages.

Daher et al., "Change Your Singer: A Transfer Learning Generative Adversarial Framework for Song to Song Conversion", International Joint Conference on Neural Networks, Jan. 30, 2020, 7 pages.

Brunner et al., "Symbolic Music Genre Transfer with CycleGAN", arXiv:1809.07575v1, Sep. 10, 2018, 8 pages.

Jayakumar et al., "ToneNet : A Musical Style Transfer", published in Towards Data Science, Nov. 28, 2017, 17 pages.

"Voice translation and audio style transfer with GANs", published in Towards Data Science, Nov. 7, 2019, 18 pages.

Search Report and Written Opinion dated Apr. 13, 2023 issued in International Patent Application No. PCT/KR2023/000222.

India Examination Report dated Feb. 12, 2025 for IN Application No. 202241000585.

* cited by examiner

METHOD AND DEVICE FOR MANAGING AUDIO BASED ON SPECTROGRAM

CROSS-REFERENCE TO RELATED APPLICATIONS

This application is a continuation of International Application No. PCT/KR2023/000222, filed on Jan. 5, 2023, in the Korean Intellectual Property Receiving Office and claiming priority to Indian Patent Application No. 202241000585, filed on Jan. 5, 2022, in the Indian Patent Office, the disclosures of which are incorporated by reference herein in their entireties.

BACKGROUND

Field

The disclosure relates to wireless audio devices, and for example, to a method and a device for managing an audio based on a spectrogram of the audio.

Description of Related Art

Wireless audio devices are very common gadgets used along with electronic devices such as a smartphone, a laptop, a tablet, a smart television, etc. Wireless audio devices operate as a host of the electronic devices to wirelessly receive an audio playing at the electronic devices, and deliver the audio to a user of the wireless audio devices. The wireless audio devices flawlessly generate the audio from wireless signals from the electronic devices only if the wireless signals are strong enough to deliver audio data to the wireless audio devices according to existing methods.

As shown in FIG. 1, a smartphone (10) located at (41) is connected to a wireless headphone (20) which is closely located at (42), where the strength of the wireless signal (30) from the smartphone (10) at the wireless headphone (20) is strong. Consider, the wireless headphone (20) is moving away from the smartphone (10) to locations (43) and (44). The strength of the wireless signal (30) from the wireless smartphone (10) at the wireless headphone (20) is medium at the location (43), and weak at the location (44) respectively. According to the existing methods, the wireless headphone (20) misses to capture certain audio data from the wireless signal (30) and often lags to generate the audio or audio drop occurs due to the weak signals at the location (44). Thus, it is desired to provide a useful solution to avoid loss of the audio data for as long as possible until the wireless headphone (20) receives the medium or strong wireless signal (30).

SUMMARY

Embodiments of the disclosure provide a method and a device e.g., a transmitter device and a receiver device, for managing an audio based on a spectrogram of the audio.

Generally, an audio drop occurs in received signal at the receiver device upon receiving a weak signal from the transmitter device. The disclosed method allows the transmitter device to convert the audio to the spectrogram and send along with a signal including the audio to the receiver device. Upon not experiencing the audio drop while generating the audio from the received signal, the receiver device generates the audio according to a conventional method. Upon experiencing the audio drop while generating the audio from the received signal, the receiver device generates the audio from the spectrogram using the disclosed method. The spectrogram consumes a much lower amount of bandwidth of the signal compared to the audio. Therefore, the receiver device more efficiently captures the spectrogram from the received signal even the received signal is weak. Thus, a user may not experience a loss of information from the audio even the received signal is weak. Moreover, a latency will also get reduced due to flawlessly generating the audio from the spectrogram.

Accordingly, example embodiments herein provide a method for managing an audio based on a spectrogram. The method includes: receiving, by a transmitter device, the audio to send to a receiver device; generating, by the transmitter device, the spectrogram of the audio; identifying, by the transmitter device, a first spectrogram corresponding to vocals in the audio and a second spectrogram corresponding to music in the audio from the spectrogram of the audio using a neural network model; extracting, by the transmitter device, a music feature from the second spectrogram; and transmitting, by the transmitter device, a signal comprising the first spectrogram, the second spectrogram, the music feature and the audio to the receiver device.

In an example embodiment, where the music feature comprises texture, dynamics, octaves, pitch, beat rate, and key of the music.

Accordingly, example embodiments herein provide a method for managing the audio based on the spectrogram. The method includes: receiving, by the receiver device, the signal comprising the first spectrogram, the second spectrogram, the music feature and the audio from the transmitter device, where the first spectrogram signifies vocals in the audio and the second spectrogram signifies music in the audio; determining, by the receiver device, whether an audio drop is occurring in the received signal based on a parameter associated with the received signal; and generating, by the receiver device, the audio using the first spectrogram, the second spectrogram, the music feature, in response to determining that the audio drop is occurring in the received signal.

In an example embodiment, determining, by the receiver device, whether the audio drop is occurring in the received signal based on the parameter associated with the received signal received, comprises: determining, by the receiver device, an audio data traffic intensity of the audio in the received signal, detecting, by the receiver device, the audio data traffic intensity matches a threshold audio data traffic intensity, predicting, by the receiver device, an audio drop rate by applying the parameter associated with the received signal to a neural network model, determining, by the receiver device, whether the audio drop rate matches a threshold audio drop rate; and performing, by the receiver device, one of: detecting that the audio drop is occurring in the received signal, in response to determining that the audio drop rate matches to the threshold audio drop rate, and detecting that the audio drop is not occurring in the received signal, in response to determining that the audio drop rate does not match to the threshold audio drop rate.

In an example embodiment, generating, by the receiver device, the audio using the first spectrogram, the second spectrogram, the music feature, comprises: generating, by the receiver device, encoded image vectors of the first spectrogram and the second spectrogram, generating, by the receiver device, a latent space vector by sampling the encoded image vectors, generating, by the receiver device, two spectrograms based on the latent space vector and the audio feature, concatenating, by the receiver device, the two spectrograms, determining, by the receiver device, whether the concatenated spectrogram is equivalent to the spectrogram of the audio based on a real data set, performing, by the receiver device, denoising, stabilization, synchronization and strengthening of the concatenated spectrogram using the neural network model, in response to determining that the concatenated spectrogram is equivalent to the spectrogram of the audio, and generating, by the receiver device, the audio from the concatenated spectrogram.

In an example embodiment, wherein the parameter associated with the received signal comprises a Signal Received Quality (SRQ), a Frame Error Rate (FER), a Bit Error Rate (BER), a Timing Advance (TA), and a Received Signal Level (RSL).

Accordingly, example embodiments herein provide a transmitter device configured to manage the audio based on the spectrogram. The transmitter device includes: an audio and spectrogram controller, a memory, a processor, where the audio and spectrogram controller is coupled to the memory and the processor; wherein the audio and spectrogram controller is configured to: receive the audio to send to the receiver device; generate the spectrogram of the audio; identify the first spectrogram corresponding to the vocals in the audio and the second spectrogram corresponding to the music in the audio from the spectrogram of the audio using a neural network model; extract the music feature from the second spectrogram; and transmit the signal comprising the first spectrogram, the second spectrogram, the music feature and the audio to the receiver device.

Accordingly, example embodiments herein provide a receiver device configured to manage the audio based on the spectrogram. The receiver device includes: an audio and spectrogram controller, a memory, a processor, where the audio and spectrogram controller is coupled to the memory and the processor. The audio and spectrogram controller is configured to: receive the signal comprising the first spectrogram, the second spectrogram, the music feature and the audio from the transmitter device, where the first spectrogram signifies vocals in the audio and the second spectrogram signifies music in the audio; determine whether the audio drop is occurring in the received signal based on the parameter associated with the received signal; and generate the audio using the first spectrogram, the second spectrogram, the music feature, in response to determining that the audio drop is occurring in the received signal.

These and other aspects of the embodiments herein will be better appreciated and understood when considered in conjunction with the following description and the accompanying drawings. It should be understood, however, that the following descriptions, while indicating various example embodiments and numerous specific details thereof, are given by way of illustration and not of limitation. Many changes and modifications may be made within the scope of the disclosure, and the embodiments herein include all such modifications.

BRIEF DESCRIPTION OF THE DRAWINGS

This method and device are illustrated in the accompanying drawings, throughout which like reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1:
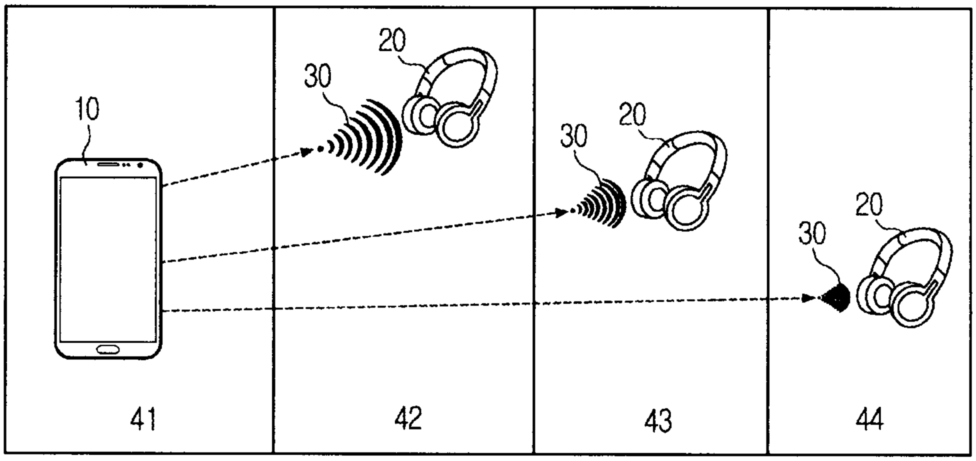
FIG. 1 (CONVENTIONAL ART)
FIG. 1 is a diagram illustrating an example scenario of communication between a smartphone and a wireless headphone, according to the prior art.

The embodiments herein and the various features and advantageous details thereof are explained in greater detail with reference to various example non-limiting embodiments illustrated in the accompanying drawings and detailed in the following description. Descriptions of well-known components and processing techniques may be omitted so as to not unnecessarily obscure the embodiments herein. The various example embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the disclosure and embodiments herein.

Various example embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to aid in understanding various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, example embodiments herein provide a method for managing an audio based on a spectrogram. The method includes receiving, by a transmitter device, the audio to send to a receiver device. The method includes generating, by the transmitter device, the spectrogram of the audio. The method includes identifying, by the transmitter device, a first spectrogram corresponding to vocals in the audio and a second spectrogram corresponding to music in the audio from the spectrogram of the audio using a neural network model. The method includes extracting, by the transmitter device, a music feature from the second spectrogram. The method includes transmitting, by the transmitter device, a signal comprising the first spectrogram, the second spectrogram, the music feature and the audio to the receiver device.

Accordingly, example embodiments herein provide a method for managing the audio based on the spectrogram. The method includes receiving, by the receiver device, the signal comprising the first spectrogram, the second spectrogram, the music feature and the audio from the transmitter device, where the first spectrogram signifies vocals in the audio and the second spectrogram signifies music in the audio. The method includes determining, by the receiver device, whether an audio drop is occurring in the received signal based on a parameter associated with the received signal. The method includes generating, by the receiver device, the audio using the first spectrogram, the second spectrogram, the music feature, in response to determining that the audio drop is occurring in the received signal.

Accordingly, example embodiments herein provide a transmitter device configured to manage the audio based on the spectrogram. The transmitter device includes an audio and spectrogram controller, a memory, a processor, where the audio and spectrogram controller is coupled to the memory and the processor. The audio and spectrogram controller is configured for receiving the audio to send to the receiver device. The audio and spectrogram controller is configured for generating the spectrogram of the audio. The audio and spectrogram controller is configured for identifying the first spectrogram corresponding to the vocals in the audio and the second spectrogram corresponding to the music in the audio from the spectrogram of the audio using the neural network model. The audio and spectrogram controller is configured for extracting the music feature from the second spectrogram. The audio and spectrogram controller is configured for transmitting the signal comprising the first spectrogram, the second spectrogram, the music feature and the audio to the receiver device.

Accordingly, example embodiments herein provide the receiver device configured to manage the audio based on the spectrogram. The receiver device includes an audio and spectrogram controller, a memory, a processor, where the audio and spectrogram controller is coupled to the memory and the processor. The audio and spectrogram controller is configured for receiving the signal comprising the first spectrogram, the second spectrogram, the music feature and the audio from the transmitter device, where the first spectrogram signifies vocals in the audio and the second spectrogram signifies music in the audio. The audio and spectrogram controller is configured for determining whether the audio drop is occurring in the received signal based on the parameter associated with the received signal. The audio and spectrogram controller is configured for generating the audio using the first spectrogram, the second spectrogram, the music feature, in response to determining that the audio drop is occurring in the received signal.

Generally, an audio drop occurs at the receiver device upon receiving a weak signal from the transmitter device. Unlike existing methods and systems, the disclosed method allows the transmitter device to convert the audio to the spectrogram and send along with a signal including the audio to the receiver device. Upon not experiencing the audio drop while generating the audio from the received signal, the receiver device generates the audio according to a conventional method. Upon experiencing the audio drop while generating the audio from the received signal, the disclosed method allows the receiver device to generate the audio from the spectrogram. The spectrogram consumes very less amount of bandwidth of the signal compared to the audio. Therefore, the receiver device may flawlessly capture the spectrogram from the received signal even the received signal is weak. Thus, a user may not experience a loss of information from the audio even the received signal is weak. Moreover, a latency will also get reduced due to flawlessly generating the audio from the spectrogram.

The disclosed method aims in speech enhancement by separating speech/vocal from background noise. These features are then concatenated by a fusion network which also outputs corresponding clean speech. So by separating vocals and music, the background noise also gets removed. The speech enhancement may use one-dimensional convolutional layers to reconstruct magnitude of the spectrogram of the clean speech and uses the magnitude to further estimate its phase spectrogram.

Referring now to the drawings, and more particularly to FIGS. 2A through 13, there are shown and described various example embodiments.

FIG. 2A is a block diagram illustrating an example configuration of a system (1000) for managing an audio, based on a spectrogram of the audio, according to various embodiments. In an embodiment, the system (1000)

includes a transmitter device (100) and a receiver device (200), in which the transmitter device (100) is wirelessly connected to the receiver device (200). Examples of the transmitter device (100) and the receiver device (200) include, but not limited to a smartphone, a tablet computer, a Personal Digital Assistance (PDA), a desktop computer, an Internet of Thing (IoT) device, a wearable device, a smart speaker, a wireless headphone, etc. In an embodiment, the transmitter device (100) includes an audio and spectrogram controller (e.g., including various control and/or processing circuitry) (110), a memory (120), a processor (e.g., including processing circuitry) (130), a communicator (e.g., including communication circuitry) (140) and a Neural Network (NN) model (e.g., including various processing circuitry and/or executable program instructions) (150).

In an embodiment, the receiver device (200) includes an audio and spectrogram controller (e.g., including processing and/or control circuitry) (210), a memory (220), a processor (e.g., including processing circuitry) (230), a communicator (e.g., including communication circuitry) (240) and a NN model (e.g., including various processing circuitry and/or executable program instructions) (250). In an embodiment, the receiver device (200) additionally includes a speaker or the receiver device (200) is connected to a speaker. The audio and spectrogram controller (110, 210) and the NN model (150, 250) are implemented by processing circuitry such as logic gates, integrated circuits, microprocessors, microcontrollers, memory circuits, passive electronic components, active electronic components, optical components, hardwired circuits, or the like, and may optionally be driven by a firmware. The circuits may, for example, be embodied in one or more semiconductor chips, or on substrate supports such as printed circuit boards and the like.

The audio and spectrogram controller (110) receives the audio to send to the receiver device (200). In an embodiment, the audio and spectrogram controller (110) receives the audio from an audio/video file stored in the memory (120). In an embodiment, the audio and spectrogram controller (110) receives the audio from an external server such as internet. In an embodiment, the audio and spectrogram controller (110) receives the audio from an incoming phone call or outgoing phone call. In an embodiment, the audio and spectrogram controller (110) receives the audio from surrounding of the transmitter device (100). Further, the audio and spectrogram controller (110) generates the spectrogram of the audio. Further, the audio and spectrogram controller (110) identifies and separates a first spectrogram corresponding to vocals in the audio and a second spectrogram corresponding to music (e.g., tone) in the audio from the spectrogram of the audio using the NN model (150). The audio and spectrogram controller (110) extracts a music feature from the second spectrogram. In an embodiment, the music feature includes texture, dynamics, octaves, pitch, beat rate, and key of the music. Examples of the music feature includes, but not limited to, melody, beats, signer style, etc.

The pitch may refer, for example, to a quality that makes it possible to judge sounds as "higher" and "lower" in a sense associated with musical melodies. The beat rate simply characterized as number of beats fixed in a minute. The beat rate enables to accurately find songs that have fixed beats per minute (bpm) and thereby to classify them in a single group. The beat rate depends on genre of the audio. For example, 60-90 bpm for reggae, 85-115 bpm for hip-hop, 120-125 bpm for jazz, etc. The key of a piece (e.g., a musical composition) is a group of pitches that forms a basis of a music composition in classical and western pop music. The texture is indicating that tempo, melodic, and harmonic elements are combined in a musical composition, determining the overall quality of the sound in a piece. The texture is often described in regard to the density, or thickness, and range, or width, between lowest and highest pitches, in relative terms as well as more specifically distinguished according to number of voices, or parts, and relationship between these voices. Monophonic texture, heterophonic texture, homophonic texture, polyphonic texture are the various textures.

The monophonic texture includes a single melodic line with no accompaniment. The heterophonic texture includes two distinct lines, the lower sustaining a drone (constant pitch) while the other line creates a more elaborate melody above it. The polyphonic texture includes multiple melodic voices which are to a considerable extent independent from or in imitation with one another. The dynamics refers to a volume of a performance. In written compositions, the dynamics are indicated by abbreviations or symbols that signify the intensity at which a note or passage should be played or sung. The dynamics can be used like punctuation in a sentence to indicate precise moments of emphasis. The dynamics of a composition can be used to determine when the artist will bring a variation in their voice, this is important because an artist can have a different diction for a song depending upon the harmony.

The octave is an interval between one musical pitch and another with double its frequency. The octave relationship is a natural phenomenon that has been referred to as the "basic miracle of music". As the frequency 'f' of a pitch doubles in value, the musical relationship remains that of an octave. Thus for any given frequency, rising octaves can be expressed as f*2^y, where 'y' is a whole number. x=log (value-1/value-2)/log (2) octaves, where value1, value2 are frequencies, and value1 and value2 are x octaves apart. Ratios of pitches to describe a scale, which has an interval of repetition, called octave. Examples of octaves are given in table 1 below.

TABLE 1

| Common terms | Example name | Frequency (Hz) | Multiple fundamentals | Ratio of pitches within octave |
|---|---|---|---|---|
| Fundamental | $A_2$ | 110 | 1x | 1/1 = 1x |
| Octave | $A_3$ | 220 | 2x | 2/1 = 2x<br>2/2 = 1x |
| Perfect Fifth | $E_4$ | 330 | 3x | 3/2 = 1.5x |
| Octave | $A_4$ | 440 | 4x | 4/2 = 2x<br>4/4 = 1x |
| Major Third | $C\#_5$ | 550 | 5x | 5/4 = 1.25x |
| Perfect Fifth | $E_5$ | 660 | 6x | 6/4 = 1.5x |
| Harmonic seventh | $G_5$ | 770 | 7x | 7/4 = 1.75x |
| Octave | $A_5$ | 880 | 8x | 8/4 = 2x<br>8/8 = 1x |

The audio and spectrogram controller (110) transmits a signal including the first spectrogram, the second spectrogram, the music feature and the audio to the receiver device (200).

The audio and spectrogram controller (210) receives the signal from the transmitter device (100). The audio and spectrogram controller (210) determines whether an audio drop is occurring in the received signal based on a parameter associated with the received signal. In an embodiment, the parameter associated with the received signal includes a Signal Received Quality (SRQ), a Frame Error Rate (FER), a Bit Error Rate (BER), a Timing Advance (TA), and a Received Signal Level (RSL). In an embodiment, the audio and spectrogram controller (210) determines an audio data traffic intensity of the audio in the received signal. Further, the audio and spectrogram controller (210) detects the audio data traffic intensity matches a threshold audio data traffic intensity. Further, the audio and spectrogram controller (210) predicts an audio drop rate by applying the parameter associated with the received signal to the NN model (250).

The audio and spectrogram controller (210) determines whether the audio drop rate matches a threshold audio drop rate. The audio and spectrogram controller (210) detects that the audio drop is occurring in the received signal, in response to determining that the audio drop rate matches to the threshold audio drop rate. Further, the audio and spectrogram controller (210) detects that the audio drop is not occurring in the received signal, in response to determining that the audio drop rate does not match to the threshold audio drop rate.

The audio and spectrogram controller (210) generates the audio using the first spectrogram, the second spectrogram, the music feature, in response to determining that the audio drop is occurring in the received signal. In an embodiment, the audio and spectrogram controller (210) generates encoded image vectors of the first spectrogram and the second spectrogram using the NN model (250). The audio and spectrogram controller (210) generates a latent space vector by sampling the encoded image vectors. The audio and spectrogram controller (210) generates two spectrograms based on the latent space vector and the audio feature using the NN model (250). The audio and spectrogram controller (210) concatenates the two spectrograms. The audio and spectrogram controller (210) determines whether the concatenated spectrogram is equivalent to the spectrogram of the audio based on a real data set. In an embodiment, the audio and spectrogram controller (210) receives audio packets from the transmitter device (100) under low network conditions, where these audio packets has all information of the audio. The audio and spectrogram controller (210) decrypts the audio packets and generates the actual audio using a Generative Adversarial Network (GAN) model. The audio and spectrogram controller (210) performs denoising, stabilization, synchronization and strengthening of the concatenated spectrogram using the NN model (250), in response to determining that the concatenated spectrogram is equivalent to the spectrogram of the audio. Further, the audio and spectrogram controller (210) generating the audio from the concatenated spectrogram using the speaker.

The memory (120) stores the audio/video file. The memory (220) stores the real data set. The memory (120) and the memory (220) stores instructions to be executed by the processor (130) and the processor (230) respectively. The memory (120, 220) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120, 220) is non-movable. In various examples, the memory (120, 220) can be configured to store larger amounts of information than its storage space. In certain examples, a non-transitory storage medium may store data that can, over time, change (e.g., in Random Access Memory (RAM) or cache). The memory (120) can be an internal storage unit or it can be an external storage unit of the transmitter device (100), a cloud storage, or any other type of external storage. The memory (220) can be an internal storage unit or it can be an external storage unit of the receiver device (200), a cloud storage, or any other type of external storage.

The processor (130, 230) may be a general-purpose processor, such as a Central Processing Unit (CPU), an Application Processor (AP), or the like, a graphics-only processing unit such as a Graphics Processing Unit (GPU), a Visual Processing Unit (VPU) and the like. The processor (130, 230) may include multiple cores to execute the instructions. The communicator (140) may include various communication circuitry and may be configured for communicating internally between hardware components in the transmitter device (100). Further, the communicator (140) is configured to facilitate the communication between the transmitter device (100) and other devices via one or more networks (e.g. Radio technology). The communicator (240) is configured for communicating internally between hardware components in the receiver device (200). Further, the communicator (240) is configured to facilitate the communication between the receiver device (200) and other devices via one or more networks (e.g. Radio technology). The communicator (140, 240) includes an electronic circuit specific to a standard that enables wired or wireless communication.

In an embodiment, when the audio does not contain the music, the transmitter device (100) converts the vocal in the audio to the first spectrogram and send the signal includes the first spectrogram and the audio to the receiver device (200). In response to detecting the audio drop in the received signal, the receiver device (200) uses the first spectrogram to generate the vocal in the audio using the speaker.

Figure 2:
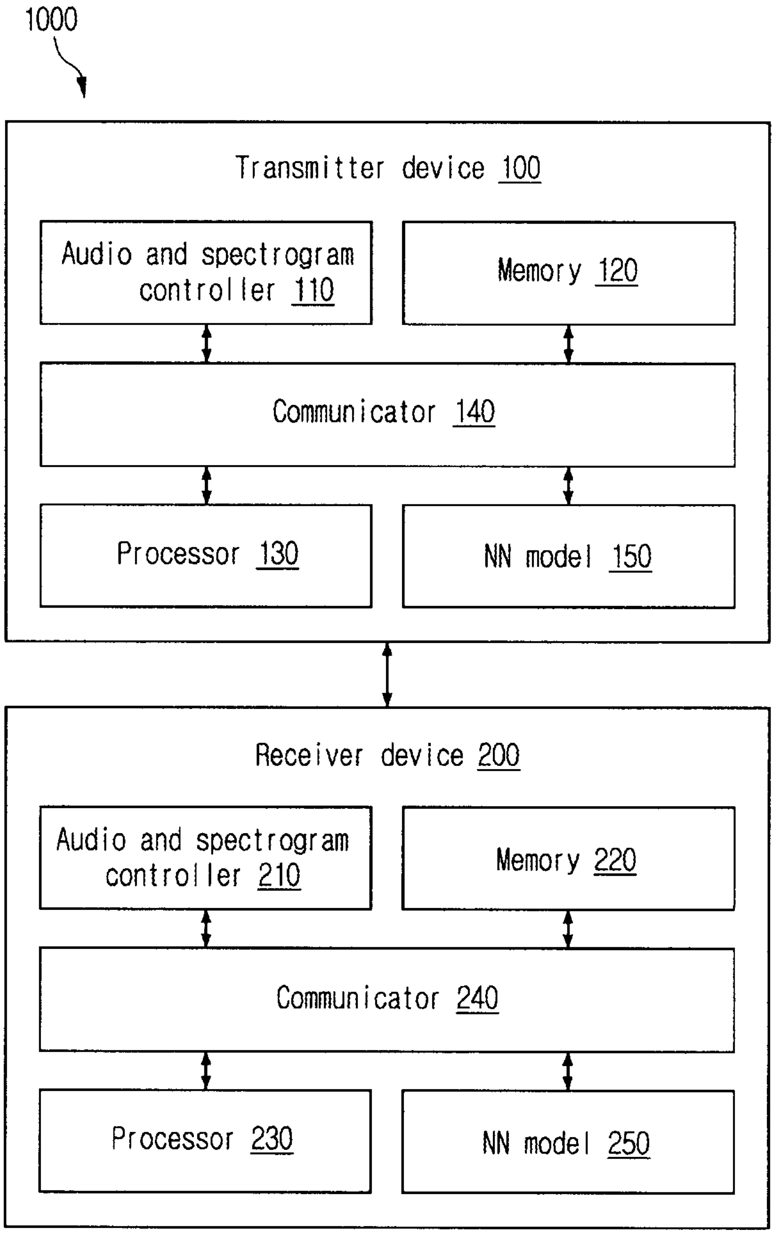
FIG. 2 is a block diagram illustrating an example configuration of a system for managing an audio based on a spectrogram of the audio, according to various embodiments.

Although FIG. 2 shows the hardware components of the system (1000) it is to be understood that other embodiments are not limited thereon. In various embodiments, the system (1000) may include less or more number of components. Further, the labels or names of the components are used only for illustrative purpose and does not limit the scope of the disclosure. One or more components can be combined together to perform same or substantially similar function for managing the audio.

Figure 3:
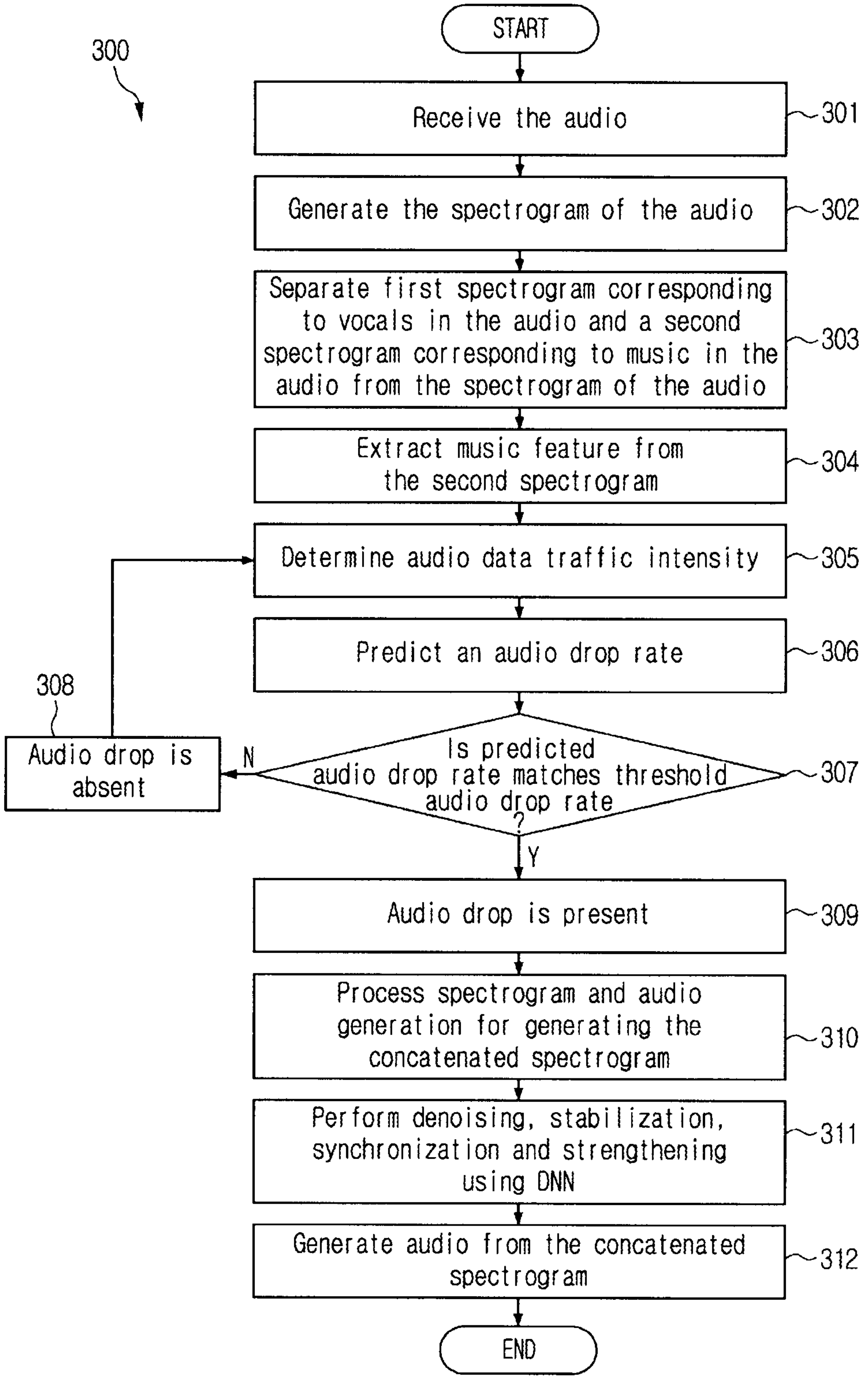
FIG. 3 is a flowchart illustrating an example method for managing the audio based on the spectrogram of the audio by a transmitter device and a receiver device, according to various embodiments.

FIG. 3 is a flowchart (300) illustrating an example method for managing the audio based on the spectrogram of the audio by the transmitter device (100) and the receiver device (200), according to various embodiments. At operation 301, the method includes receiving the audio. At operation 302, the method includes generating the spectrogram of the audio. At operation 303, the method includes separating the first spectrogram corresponding to the vocals in the audio and the second spectrogram corresponding to the music in the audio from the spectrogram of the audio. At operation 304, the method includes extracting the music feature from the second spectrogram. At operation 305, the method includes determining the audio data traffic intensity of the audio. At operation 306, the method includes predicting the audio drop rate in the audio. At operation 307, the method includes determining whether the predicted audio drop rate matches a threshold audio drop rate.

At operation 308, the method includes identifying that audio drop is absent in the audio, upon determining that the predicted audio drop rate does not match the threshold audio drop rate. The method further flows from operation 308 to operation 305. At operation 309, the method includes identifying that audio drop is present in the audio, upon determining that the predicted audio drop rate matches the threshold audio drop rate. At operation 310, the method includes processing the spectrogram and audio generation for generating the concatenated spectrogram. At operation 311, the method includes performing denoising, stabilization, synchronization and strengthening using the NN model (250) on the concatenated spectrogram. At operation 312, the method includes generating the audio from the concatenated spectrogram. A Deep Neural Network (DNN) in the NN model (250) may be trained by performing feed forwarding and backward propagation generating the audio.

Figure 4:
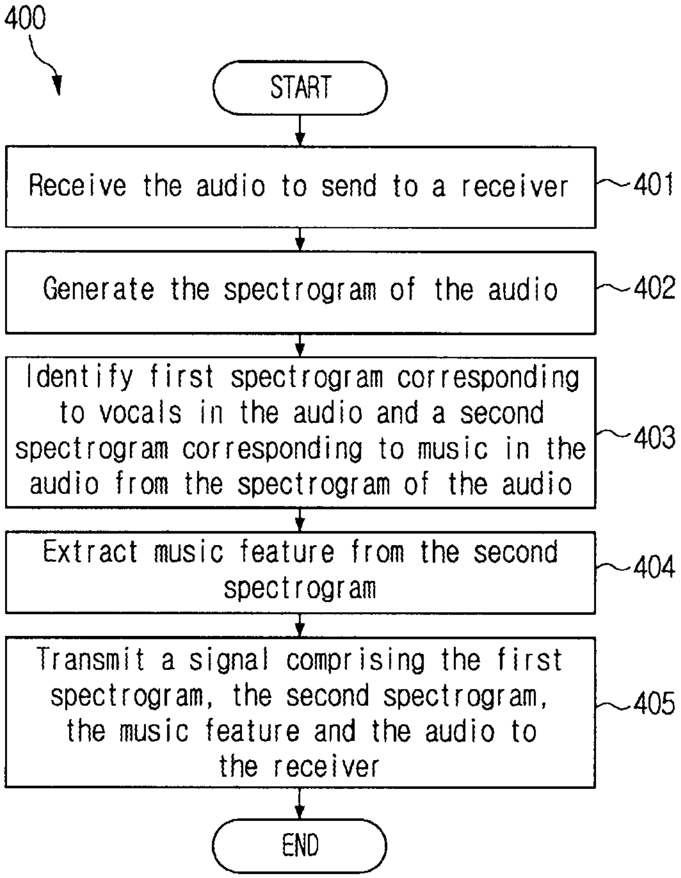
FIG. 4 is a flowchart illustrating an example method for managing the audio based on the spectrogram of the audio by the transmitter device, according to various embodiments.

FIG. 4 is a flowchart (400) illustrating an example method for managing the audio based on the spectrogram of the audio by the transmitter device (100), according to various embodiments. In an embodiment, the method allows the audio and spectrogram controller (110) to perform operations (401-405) of the flowchart (400). At operation 401, the method includes receiving the audio to send to a receiver device (200). At operation 402, the method includes generating the spectrogram of the audio. At operation 403, the method includes identifying the first spectrogram corresponding to the vocals in the audio and the second spectrogram corresponding to the music in the audio from the spectrogram of the audio. At operation 404, the method includes extracting the music feature from the second spectrogram. At operation 405, the method includes transmitting the signal including the first spectrogram, the second spectrogram, the music feature and the audio to the receiver device (200).

Figure 5:
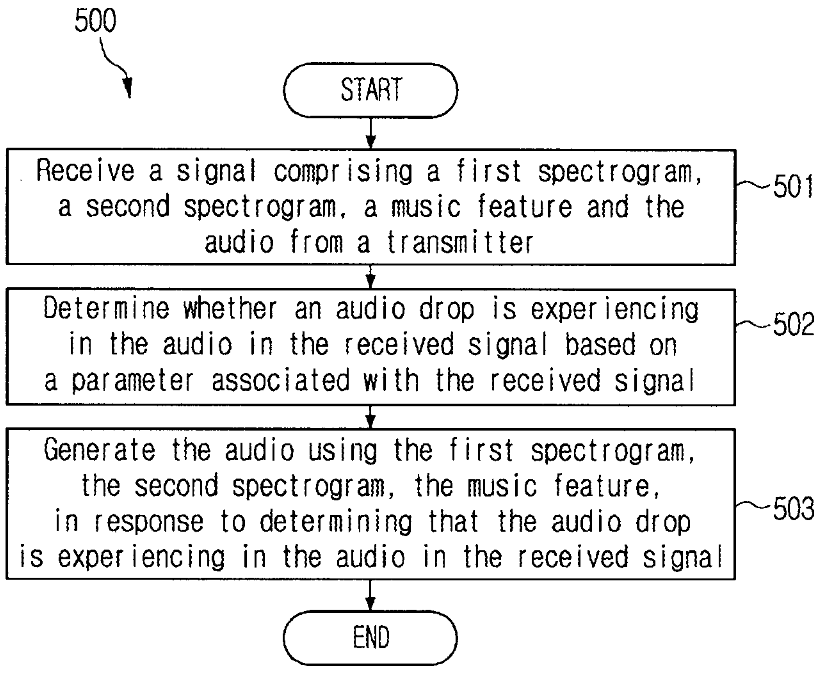
FIG. 5 is a flowchart illustrating an example method for managing the audio based on the spectrogram of the audio by the receiver device, according to various embodiments.

FIG. 5 is a flowchart (500) illustrating an example method for managing the audio based on the spectrogram of the audio by the receiver device (200), according to various embodiments. In an embodiment, the method allows the audio and spectrogram controller (210) to perform operations (501-503) of the flowchart (500). At operation 501, the method includes receiving the signal including the first spectrogram, the second spectrogram, the music feature and the audio from the transmitter device (100), where the first spectrogram signifies the vocals in the audio and the second spectrogram signifies the music in the audio. At operation 502, the method includes determining whether the audio drop is occurring in the received signal based on a parameter associated with the received signal. At operation 503, the method includes generating the audio using the first spectrogram, the second spectrogram, the music feature, in response to determining that the audio drop is occurring in the received signal.

The various actions, acts, blocks, steps, or the like in the flowcharts (300, 400, and 500) may be performed in the order presented, in a different order or simultaneously. Further, in various embodiments, some of the actions, acts, blocks, steps, or the like may be omitted, added, modified, skipped, or the like without departing from the scope of the disclosure.

Figure 6A:
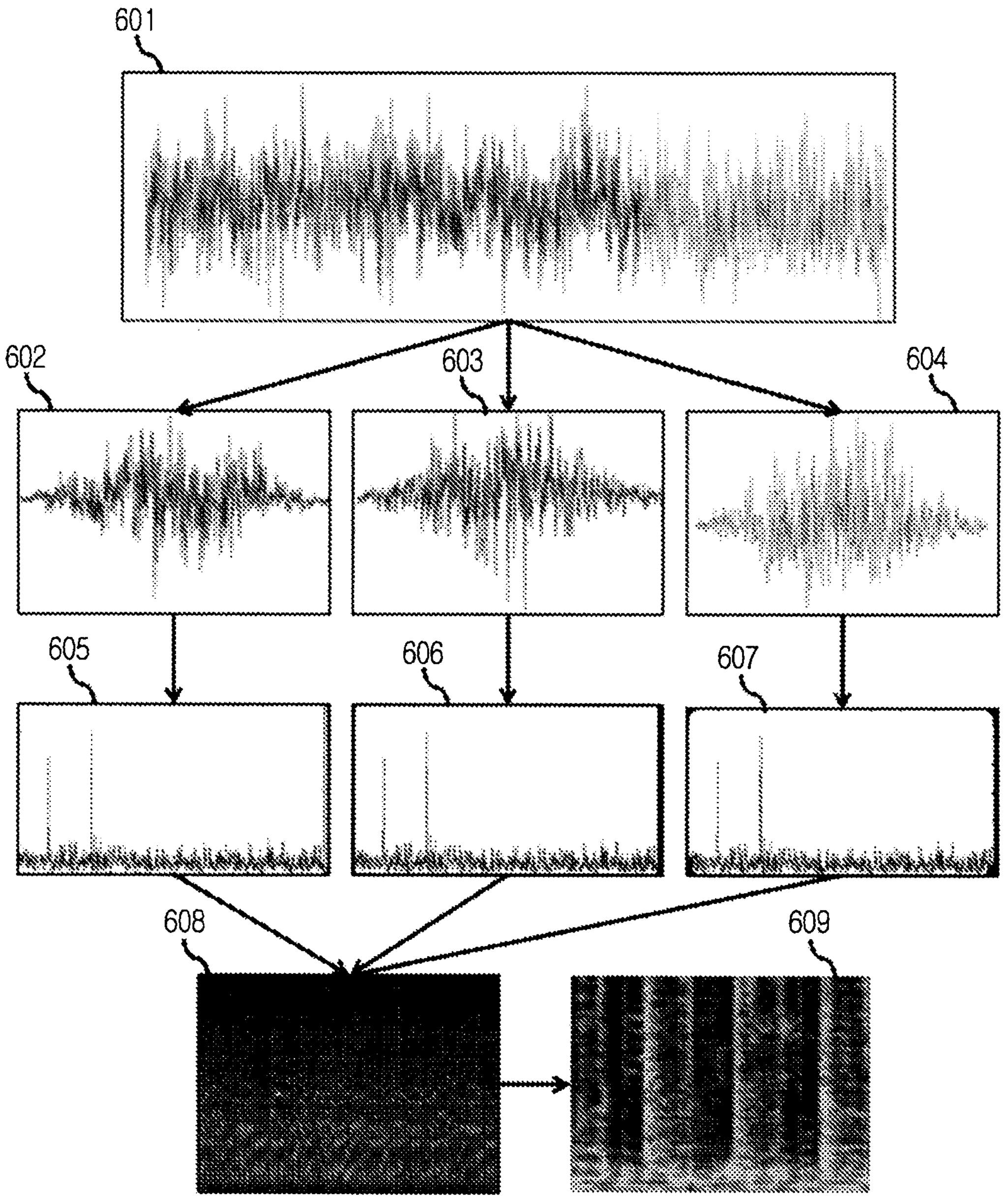
FIG. 6A is a diagram illustrating an example of generating the spectrogram from the audio, according to various embodiments.

FIG. 6A is a diagram illustrating an example of generating the spectrogram from the audio, according to various embodiments. (601) represents variation of amplitude of the audio in time domain. The amplitude provides information about loudness of the audio. The transmitter device (100) analyses the variation of the amplitude of the audio in time domain, in response to receiving the audio. Further, the transmitter device (100) segments the amplitude of the audio in time domain into multiple tiny segments (602, 603, 604, which may be referred to as 602-604). Further, the transmitter device (100) determines a Short-Term Fourier Transform (STFT) (605, 606, 607, which may be referred to as 605-607) of each tiny segment (602-604). Further, the transmitter device (100) generates the spectrogram (608) of the audio using the STFT (605-607) of each tiny segment (602-604). The spectrogram is a 2-dimensional representation of the frequency magnitudes over the time axis. The spectrogram is considered as a 2-dimensional image for processing and feature extraction by the transmitter device (100). The transmitter device (100) converts the spectrogram (608) to a Mel-scale as shown in (609).

Figure 6B:
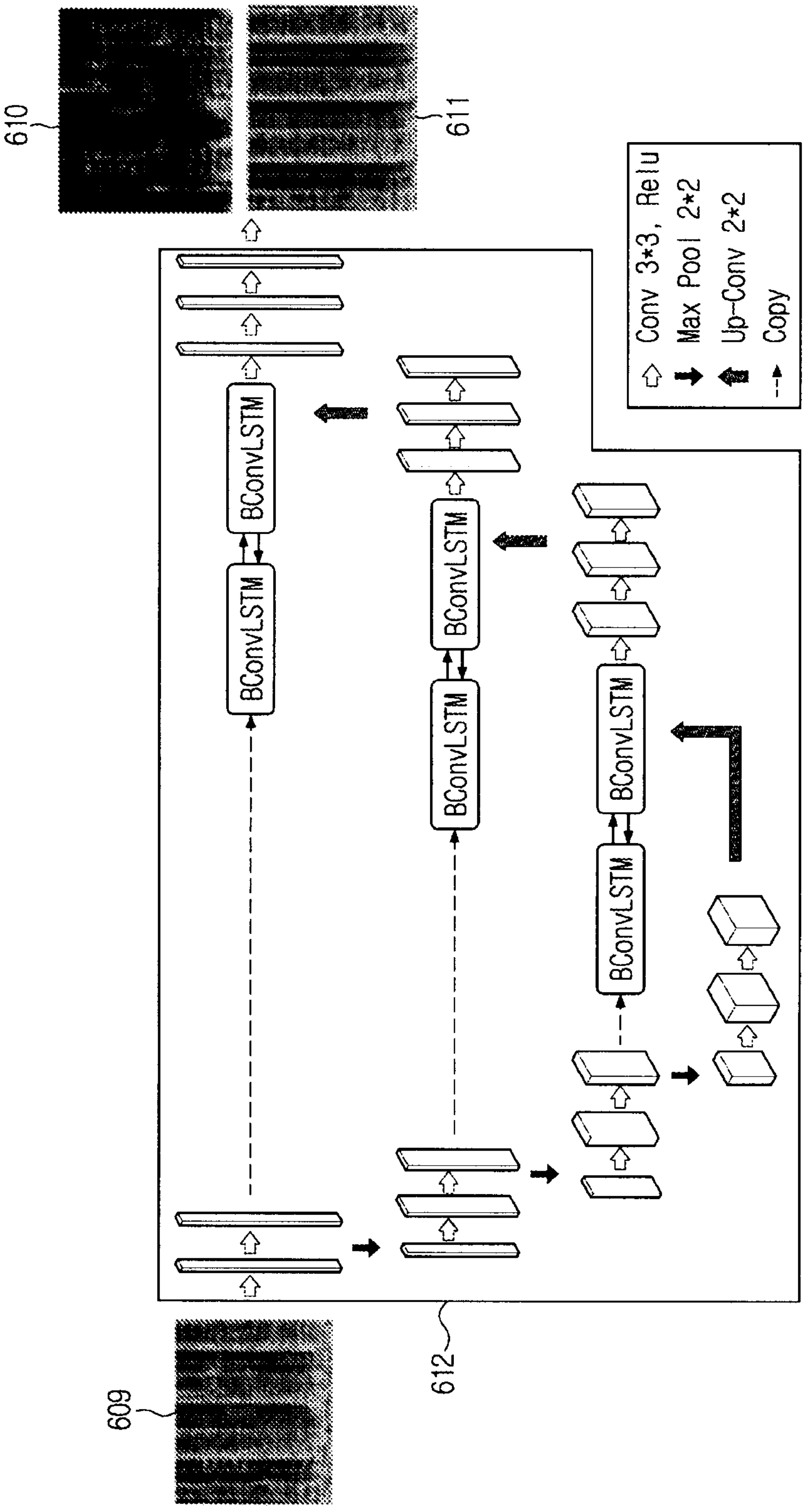
FIG. 6B is a diagram illustrating an example of separating a first spectrogram and a second spectrogram from the spectrogram of the audio, according to various embodiments.

FIG. 6B is a diagram illustrating an example of separating the first spectrogram and the second spectrogram from the spectrogram of the audio, according to various embodiments. (612) represents an architecture of the NN model (150) that separates the first spectrogram (610) and the second spectrogram (611) from the spectrogram in the Mel-scale (609). Binary cross entropy loss function is a function which is used by the NN model (150) to classify an input into two classes (e.g., first spectrogram (610) and the second spectrogram (611)) using many features, where values of the features are 0 or 1. The NN model (150) predicts the first or second spectrograms from the spectrogram in the Mel-scale (609). The spectrogram in the Mel-scale (609) is an input to the NN model (150), and the first spectrogram (610) and the second spectrogram (611) are outputs of the NN model (150).

The binary cross-entropy loss function, Hy(q)=−y*log(q(y))−(1−y)*log(1−q(y)). Soft max function, $$p_k(x) = \exp(a_k(x)) \Big/ \sum_{k'=1}^{k} \exp(a_{k'}(x)),$$

where k is a feature channel, ak(x) is an activation in feature channel k at pixel position x, y is a binary label for classes, q is a probability of belonging to y class, and x is an input vector.

Variational Autoencoder-Generative Adversarial Network (VAE-GAN) of the NN model (150) ensures that the first spectrogram (610) and the second spectrogram (611) are continuous. If the first spectrogram (610) and the second spectrogram (611) are not continuous, then the receiver device (200) marks the concatenated spectrogram as fake. As the VAE-GAN operates on each spectrogram individually, this property can be applied to the audio of arbitrary length.

Figure 7:
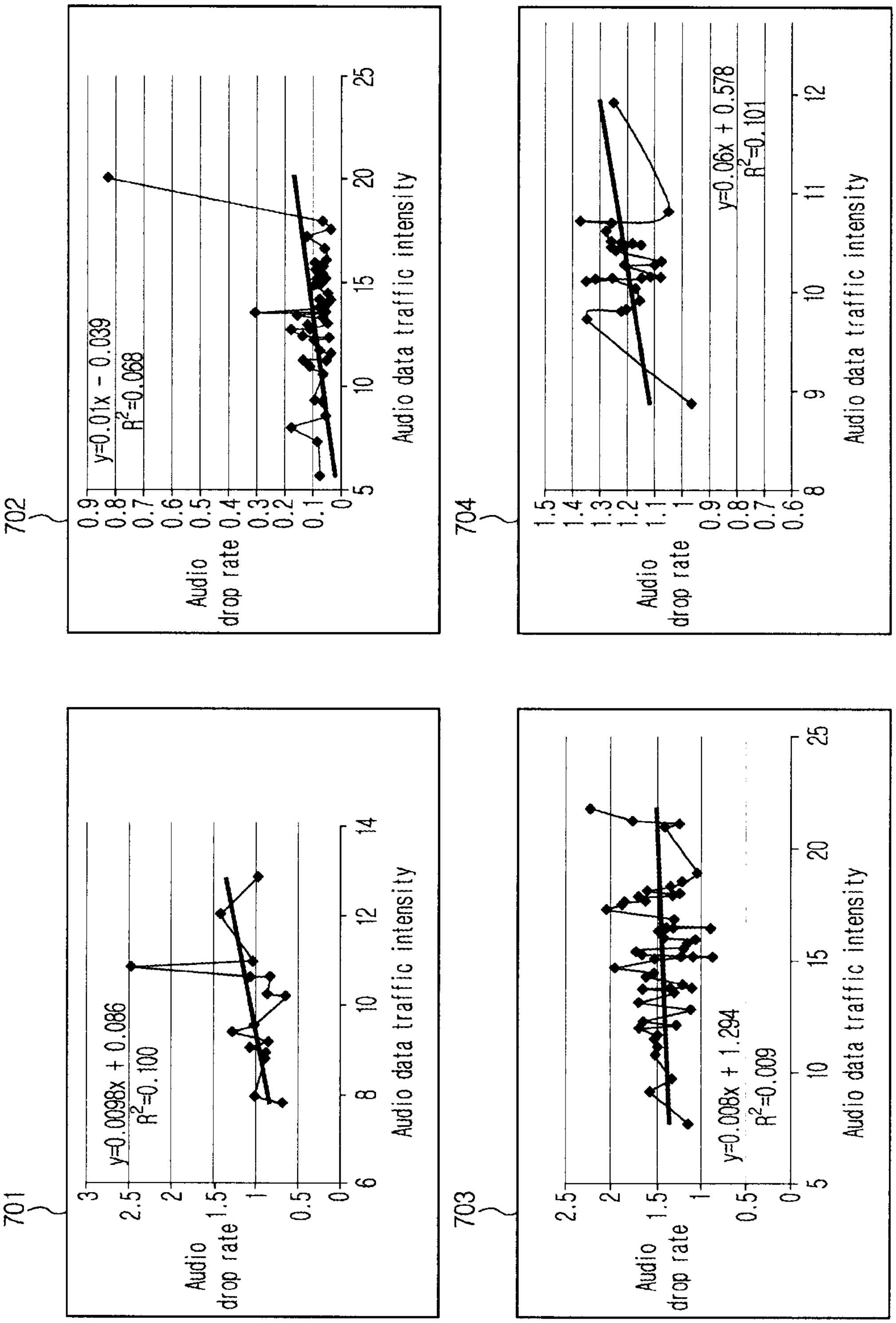
FIG. 7 is a diagram including graphs illustrating an example of determining an audio data traffic intensity from a received signal by the receiver device, according to various embodiments.

FIG. 7 is a diagram illustrating example graphs of determining the audio data traffic intensity from the received signal by the receiver device (200), according to various embodiments. The receiver device (200) determines a relation between an audio data traffic intensity and the audio drop rate. Dropping a phone call is an example for the audio drop. The phone call can be dropped to various reasons such as a sudden loss, insufficient signal strength on uplink or/and downlink, bad quality of the uplink or/and downlink, and excessive time advance. (701, 702, 703 and 704, which may be referred to as 701-704) are graphs represent a plot of the audio data traffic intensity against the audio drop rate for 4 phone calls respectively. The receiver device (200) predicts the audio drop rate in response to determining that the audio data traffic intensity matches to the threshold audio data traffic intensity.

Figure 8A:
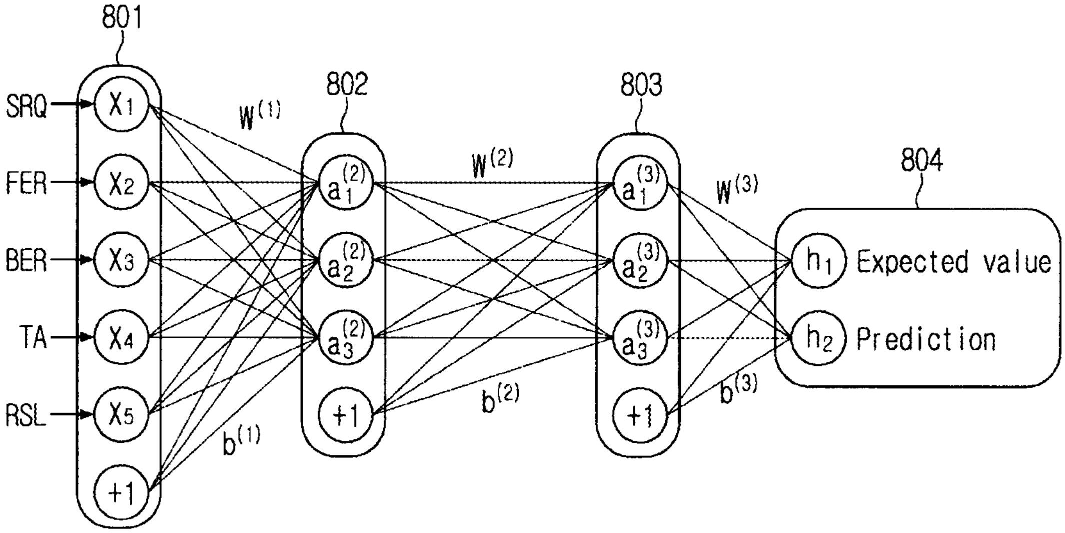
FIG. 8A, 8B and 8C are diagrams illustrating example configurations of a neural network model for predicting an audio drop rate in the received signal, according to various embodiments.
Figure 8B:
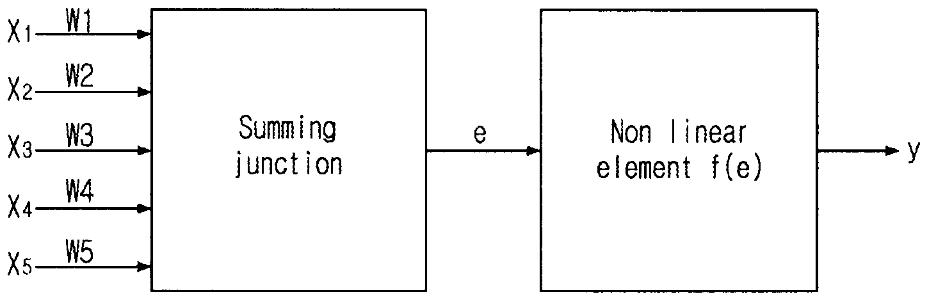
Figure 8C:
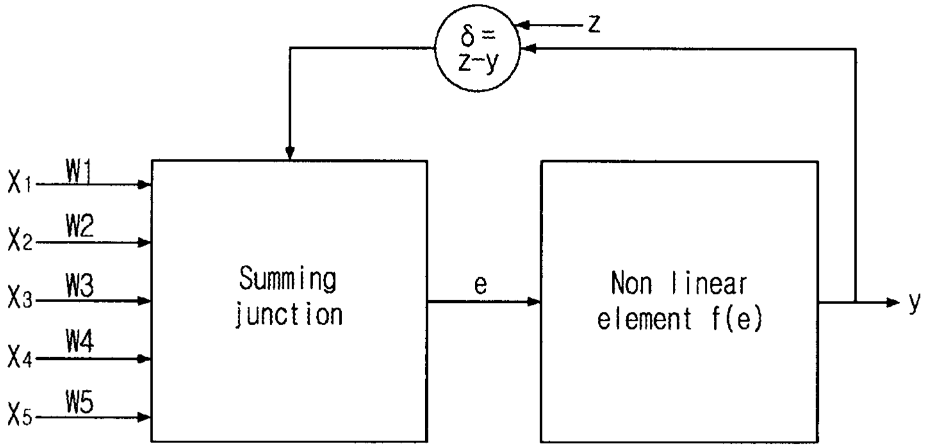

FIGS. 8A, 8B and 8C diagrams illustrating examples of the NN model (250) for predicting the audio drop rate in the received signal, according to various embodiments. As shown in FIG. 8A, the NN model (250) for predicting the audio drop rate includes a first layer which is an input layer (801), a second hidden layer (802), a third hidden layer (803), and a fourth layer which is an output layer (804). The parameter associated with the received signal includes the SRQ, the FER, the BER, the TA, and the RSL are given to the input layer (801). The SRQ is a measure of speech quality and used for speech quality evaluation. The FER is used to determine the quality of a signal connection, where FER is a value between 0 and 100%. FER=data received with error/total data received.

The BER is a percentage of bits with errors divided by the total number of transmitted bits defined. The TA refers to a time length taken for a mobile station signal to communicate with a base station. The RSL refers to a radio signal level or strength of the mobile station signal which was received from a base station transceiver's transmitting antenna. The output layer (804) provides an expected value and a prediction of the audio drop rate. If the predicted audio drop rate is less than or equal to 0.5, then the expected value is 0, whereas if the predicted audio drop rate is greater than 0.5, then the expected value is 1. Values of the parameter associated with the received signal, the predicted audio drop rate and the expected value in an example is given in table 2.

TABLE 2

| RSL (dBm) | SRQ | FER | BER | TA | Expected value | Prdicted audio drop rate |
|---|---|---|---|---|---|---|
| −103 | 18.1 | 100 | 8.9 | 1 | 1 | 0.6615 |
| −107 | 18.1 | 100 | 17.7 | 0 | 1 | 0.6615 |
| −96 | 9.05 | 0 | 16.7 | 4 | 0 | 0.3612 |
| −105 | 9.05 | 0 | 2.7 | 3 | 0 | 0.3612 |
| −106 | 9.05 | 0 | 10.6 | 3 | 0 | 0.3612 |

In an embodiment, the NN model (250) includes a summing junction and a nonlinear element f(e) as shown in FIG. 8B. Inputs $X_1$-$X_5$ to the summing junction are given by multiplying the inputs $X_1$-$X_5$ with a weightage factor ($W_1$-$W_5$). The nonlinear element f(e) receives an output (e) of the summing junction and applies a function f(e) over the output (e) to generate an output (y). Equations to determine y is given below.

y1=f1 (x1 w(x1)1+x2 w(x2)1+x3 w(x3)1+x4 w(x4)1+x5 w(x5)1).

y2=f2 (x1 w(x1)2+x2 w(x2)2+x3 w(x3)2+x4 w(x4)2+x5 w(x5)2).

y4=f4 (x1 w(x1)4+x2 w(x2)4+x3 w(x3)4+x4 w(x4)4+ x5w(x5)4).

y5=f5 (y1 w15+y2 w25 +y3 w35 +y4 w45).

y9=f9 (y1 w19 +y2 w29 +y3 w39 +y4 w49).

ya=f10 (y5 w5a+y6 w6a+y7 w7a+y8 w8a+y9a).

yd=f13 (y5 w5d+y6 w6d+y7 w7d+y8 w8d+y9d).

In an embodiment, the NN model (250) includes the summing junction, the nonlinear element f(e), and an error function (δ) as shown in FIG. 8C. Inputs $X_1$-$X_5$ to the summing junction are given by multiplying the inputs $X_1$-$X_5$ with a weightage factor ($W_1$-$W_5$). The nonlinear element f(e) receives the output (e) of the summing junction and applies the function f(e) over the output (e) to generate the output (y). Further, the error function is calculated as per the expression, δ=z-y, where z an output of block P(C) (refer FIG. 9C). The summing junction further uses the error function to determine the output (e) on next iteration. $y_m$ is the output of $m^{th}$ neuron with f(n) as the activation function. w(x(m)n) (e.g., wmn) represent the weights of connections between network input x(m) and neuron n in the input layer. A new weight (e.g., $w'_{mn}$) of connections in next iteration can be determined using the equation given below.

$$w'_{mn} = w_{mn} + \eta\delta_n(df_1(e)/de)y_m$$

where $\delta_n$ is the error function.

Figure 9A:
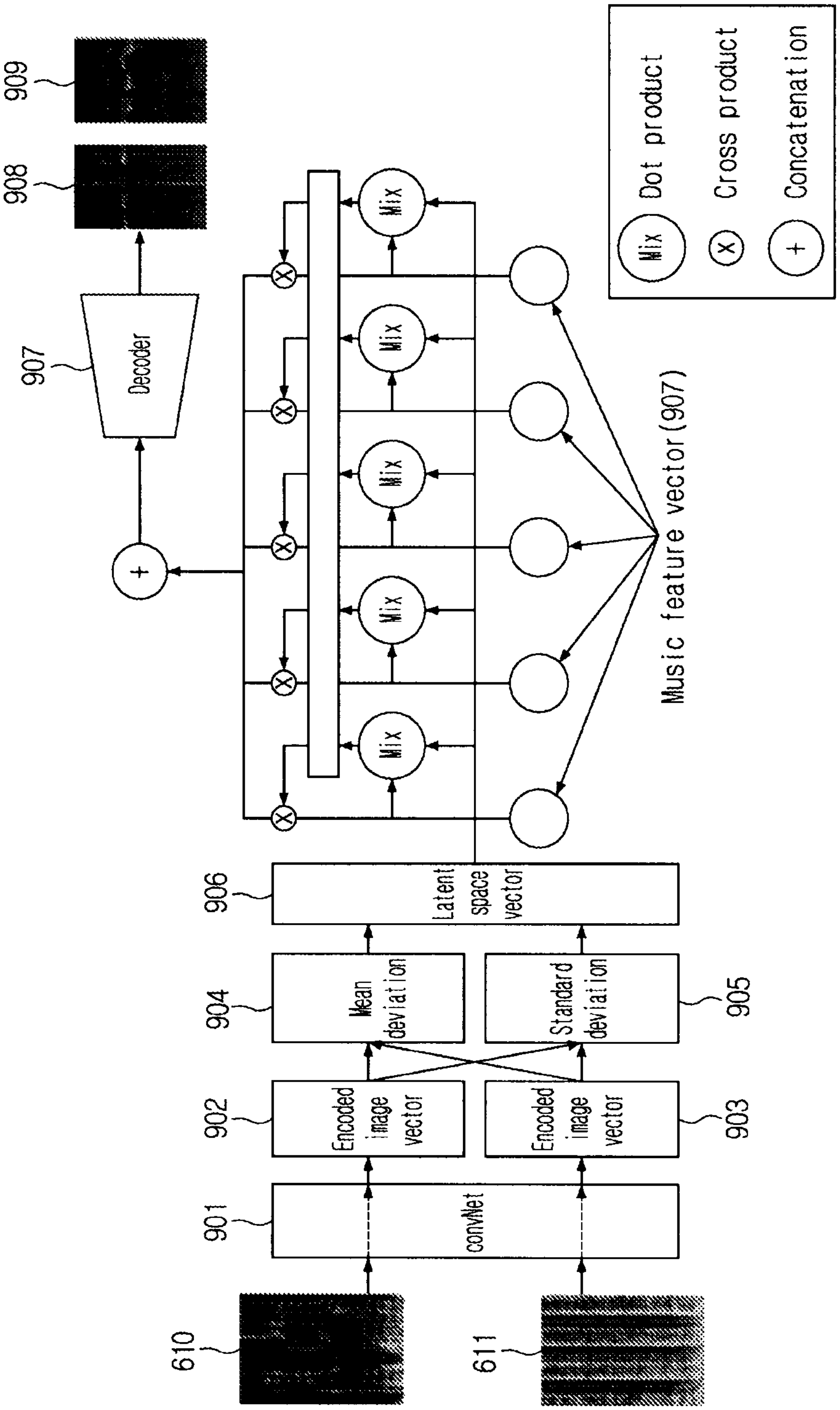
FIG. 9A is a diagram illustrating an example of generating two spectrograms using the first spectrogram, the second spectrogram, and music feature by the receiver device, according to various embodiments.

FIG. 9A is a diagram illustrating an example of generating two spectrograms using the first spectrogram, the second spectrogram, and music feature by the receiver device, according to various embodiments. Upon receiving the signal from the transmitter device (100), the receiver device (200) performs convolution on the first spectrogram (610), and the second spectrogram (611) using a convNet (901) to generate the encoded image vectors (902, 903) of the first spectrogram (610) and the second spectrogram (611). Upon generating the encoded image vectors (902, 903), the receiver device (200) generates the latent space vector (906) by sampling a mean (904) and a standard deviation (905) of the encoded image vectors (902, 903).

Further, the receiver device (200) determines a dot product of the latent space vector (906) and each music feature (907) that is in vector form. Further, the receiver device (200) passes the dot product value through a SoftMax layer and performs a cross product with the latent space vector (906). Further, the receiver device (200) concatenates all the cross products values and pass to a decoder (907). Further, the receiver device (200) generates the two spectrograms (908, 909) using the decoder (907), the decoder (907) decodes the cross products values.

Figure 9B:
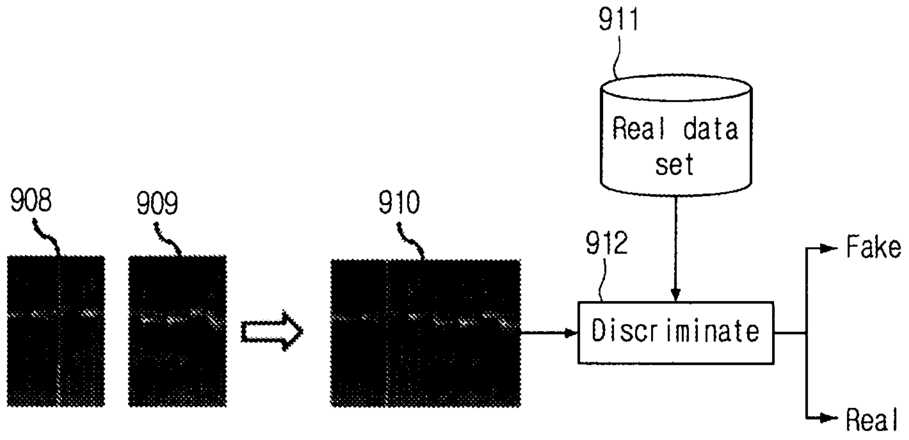
FIG. 9B is a diagram illustrating an example of comparing a concatenated spectrogram with a real data set by the receiver device, according to various embodiments.

FIG. 9B is a diagram illustrating an example of comparing the concatenated spectrogram with the real data set by the receiver device, according to various embodiments. Upon generating the two spectrograms (908, 909) using the decoder (907), the receiver device (200) concatenates the two spectrograms (908, 909) to form the concatenated spectrogram (910). Further, the receiver device (200) compares the concatenated spectrogram (910) with the real data set (911) in the memory (220) using the NN model (250). Further, the receiver device (200) discriminates (912) whether the concatenated spectrogram (910) is real or fake based on the comparison.

The receiver device (200) checks whether the concatenated spectrogram is equivalent to the spectrogram of the audio for the comparison. If the concatenated spectrogram is equivalent to the spectrogram of the audio, then the receiver device (200) identifies the concatenated spectrogram (910) as real. If the concatenated spectrogram is not equivalent to the spectrogram of the audio, then the receiver device (200) identifies the concatenated spectrogram (910) as fake.

Figure 9C:
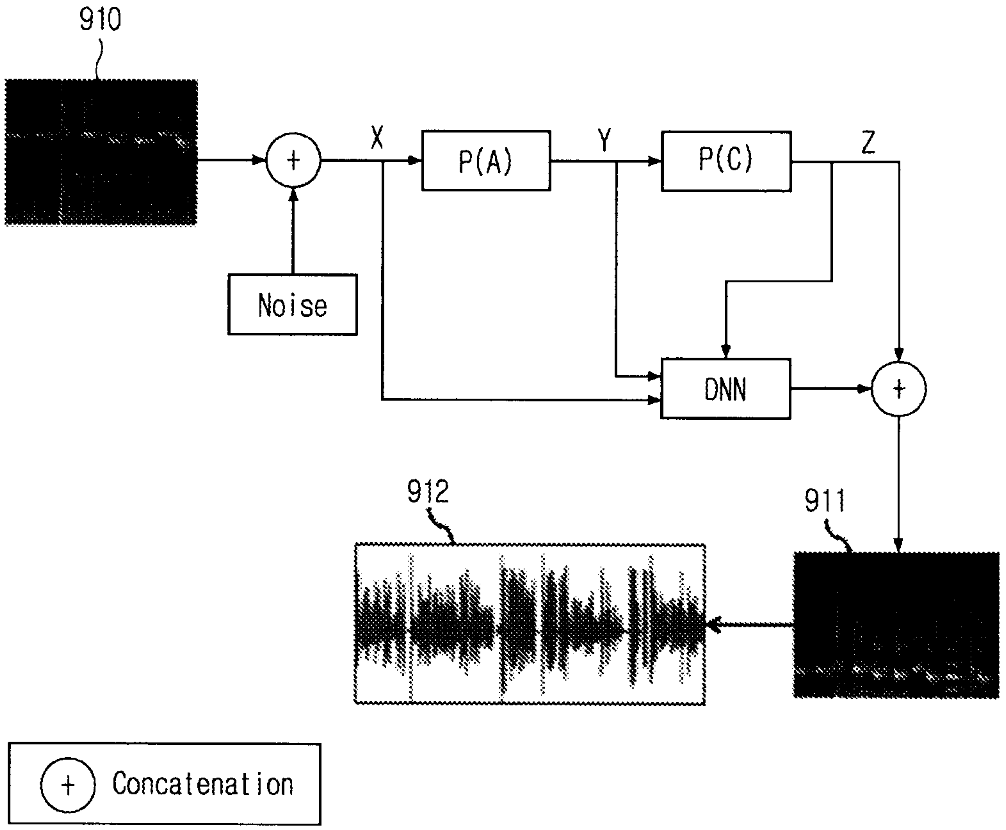
FIG. 9C is a diagram illustrating an example of generating the audio from the concatenated spectrogram by the receiver device, according to various embodiments.

FIG. 9C is a diagram illustrating an example of generating the audio from the concatenated spectrogram by the receiver device, according to various embodiments. Upon identifying that the concatenated spectrogram (910) is real, the receiver device (200) performs denoising, stabilization, synchronization and strengthening of the concatenated spectrogram using the NN model (250). Blocks P(A), P(C) and the DNN of the NN model (250) are responsible for denoising, stabilization, synchronization and strengthening of the concatenated spectrogram. The concatenated spectrogram (910) may also comprise a noise, which is the input (X) of the block P(A). The block P(A) perfectly removes noise in terms of amplitude from the concatenated spectrogram (910) and generates an output (Y). The output (Y) of the block P(A) is sent to the block P(C).

The block P(C) eliminates inconsistent components contained in the output (Y) and generates an output (Z). The DNN receives the input (X), the output (Y), and the output (Z) and improves a quality of the concatenated spectrogram. The DNN requires low computational cost and provide changeable number of iterations as parameters, which are shared between layers. The output from the DNN and the output (Z) concatenates to form a synchronized, strong and stabilized spectrogram (911) without the noise. The spectrogram (911) can be determined using the equation as follows. $X[m+1]=B(X[m])=Z[m]-DNN(X[m], Y[m], Z[m])$, where B is a Deep Griffin Lim (DeGLI) block and the spectrogram (911).

In an example, the receiver device (200) uses Griffin-Lim method to reconstruct the audio from the spectrogram (911) by phase reconstruction from the amplitude spectrogram (911). The Griffin-Lim method employs alternating convex projections between a time-domain and a STFT domain that monotonically decrease a squared error between a given STFT magnitude and a magnitude of an estimated time-domain signal, which produces an estimate of the STFT phase.

Figure 10:
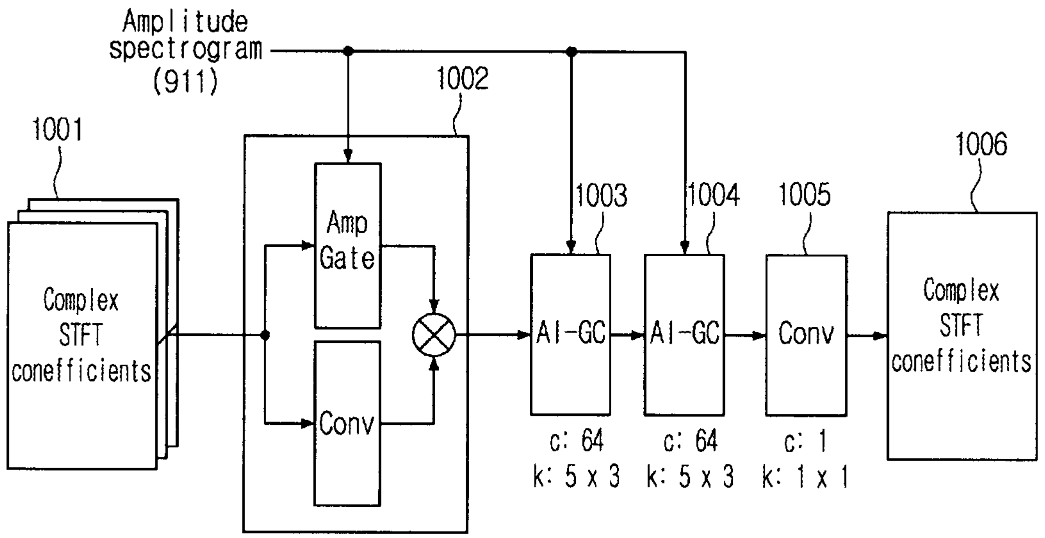
FIG. 10 is a block diagram illustrating an example configuration of a DNN for improving quality of the concatenated spectrogram, according to various embodiments.

FIG. 10 is a diagram illustrating an example configuration of the DNN for improving quality of the concatenated spectrogram, according to various embodiments. The DNN includes serially connected three Amplitude-based Gated Complex Convolution (AI-GCC) layers (1002, 1003 and 1004, which may be referred to as 1002-1004) and a complex convolution layer (1005) without bias. Kernel size (k) and number of channels (c) of the AI-GCC layers (1002-1004) are 5×3 and 64 respectively. The first AI-GCC layer (1002) receives a previous set of complex STFT coefficients (1001) and all the AI-GCC layers (1002-1004) receives the amplitude spectrogram (911) for generating a new complex STFT coefficient (1006). Stride sizes for all convolution layers (1005) were set to 1×1.

Figure 11:
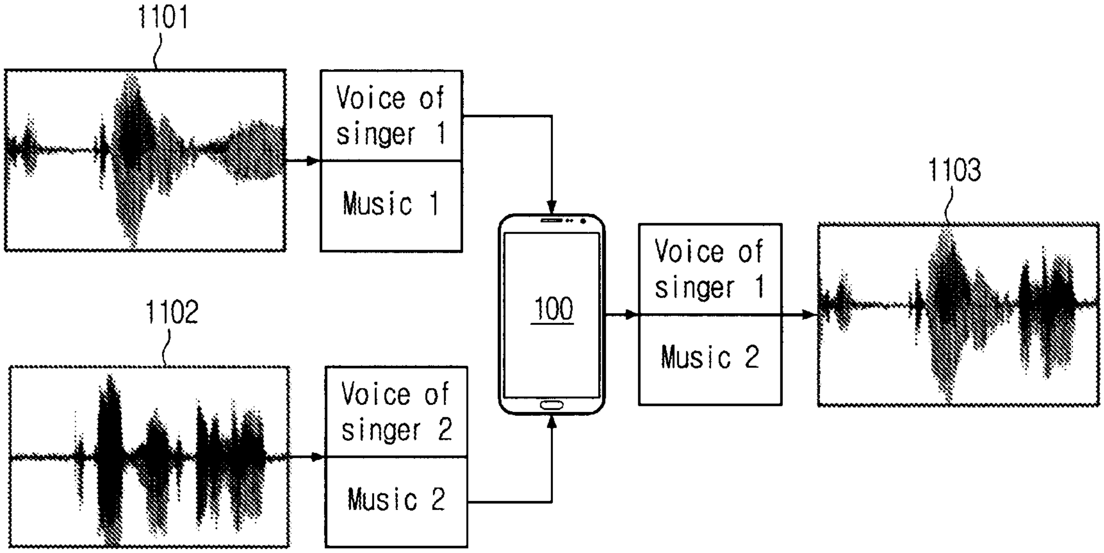
FIGS. 11, 12, and 13 are diagrams illustrating example scenarios of managing the audio as per various user requirement, according to various embodiments.
Figure 12:
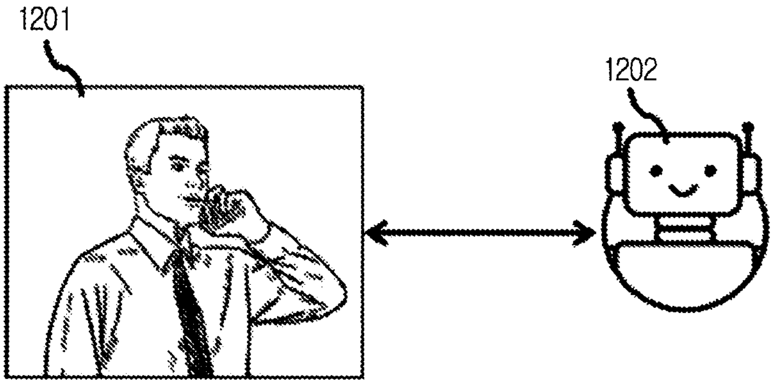
Figure 13:
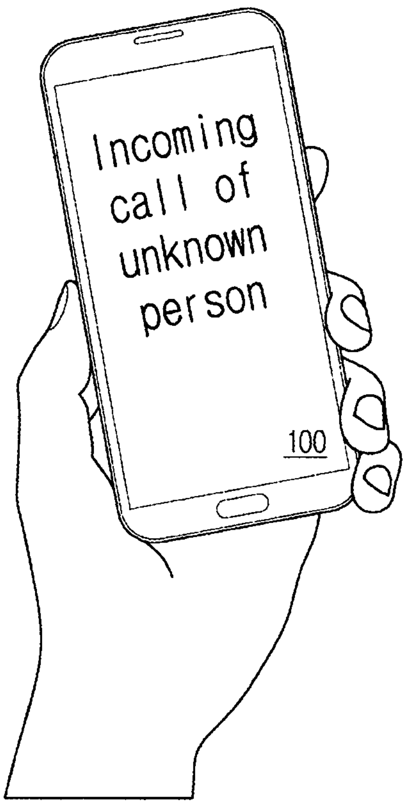

FIGS. 11, 12 and 13 are diagrams illustrating example scenarios of managing the audio as per various user requirement, according to various embodiments. As shown in FIG. 11, consider a smartphone (100) contains two songs (1101, 1102). The first song (1101) contains voice of singer 1 and music 1, whereas the second song (1102) contains voice of singer 2 and music 2. The method allows the smartphone (100) to separate the spectrograms of the voice of singer 1, the music 1, the voice of singer 2 and the music 2. Further, the smartphone (100) selects the spectrograms of the voice of singer 1 and the music 2 to generate a new song (1103) by combining the spectrograms of the voice of singer 1 and the music 2. Moreover, the smartphone (100) can change other song styles like generating instrumental version of the song.

As shown in FIG. 12, a user (1201) is talking to a voice chatbot (1202) using the smartphone (100). The method allows the smartphone (100) to generate the spectrogram of the audio of the user. Further, the smartphone (100) chooses a spectrogram of a target accent (e.g. British English accent) which is already available in the smartphone (100). Further, the smartphone (100) combines the spectrogram of the target accent with the spectrogram of the audio of the user to add the target accent with the utterance in the audio, which enhance user experience.

As shown in FIG. 13, the smartphone (100) receives a call from an unknown person to the user. Upon attending the call, the method allows the smartphone (100) to give an option to the user to mask the voice of the user in a call session. If the user selects the option to mask the voice, then the smartphone (100) converts the voice of the user and background audio to spectrograms, filters out the spectrogram of the voice of the user, and regenerates the background audio from the spectrogram of the background audio. Further, the smartphone (100) sends only the regenerated background audio to the unknown caller in the call. Thus, the voice of the user can be masked during the phone call for securing a user's voice identity from the unknown caller.

The various example embodiments disclosed herein can be implemented using at least one hardware device and performing network management functions to control the elements.

While the disclosure is illustrated and described reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for managing an audio based on a spectrogram, the method comprising:

receiving, by a transmitter device, the audio to send to a receiver device;

generating, by the transmitter device, the spectrogram of the audio;

identifying, by the transmitter device, a first spectrogram corresponding to vocals in the audio and a second spectrogram corresponding to music in the audio from the spectrogram of the audio using a neural network model;

extracting, by the transmitter device, a music feature from the second spectrogram; and transmitting, by the transmitter device, a signal comprising the first spectrogram, the second spectrogram, the music feature and the audio to the receiver device, receiving, by a receiver device, a signal comprising a first spectrogram, a second spectrogram, a music feature and the audio from a transmitter device, wherein the first spectrogram corresponds to vocals in the audio and the second spectrogram corresponds to a music in the audio;

determining, by the receiver device, whether an audio drop is occurring or predicted to occur in the received signal based on a parameter associated with the received signal; and generating, by the receiver device, the audio including the vocals and the music using the first spectrogram, the second spectrogram, the music feature, in response to determining that the audio drop is occurring or is predicted to occur in the received signal, wherein the music feature comprises at least one of texture, dynamics, octaves, pitch, beat rate, and key of the music in the audio, wherein generating, by the receiver device, the audio using the first spectrogram, the second spectrogram, the music feature, comprises:

generating, by the receiver device, encoded image vectors of the first spectrogram and the second spectrogram;

generating, by the receiver device, a latent space vector by sampling the encoded image vectors;

generating, by the receiver device, the audio based on the latent space vector and the music feature.

2. The method as claimed in claim 1, wherein the music feature comprises the texture, the dynamics, the octaves, the pitch, the beat rate, and the key of the music in the audio.

3. The method as claimed in claim 1, wherein determining, by the receiver device, whether the audio drop is occurring in the received signal based on the parameter associated with the received signal, comprises:

determining, by the receiver device, an audio data traffic intensity of the audio in the received signal;

detecting, by the receiver device, whether the audio data traffic intensity matches a threshold audio data traffic intensity;

predicting, by the receiver device, an audio drop rate by applying the parameter associated with the received signal to a neural network model;

determining, by the receiver device, whether the audio drop rate matches a threshold audio drop rate; and performing, by the receiver device, at least one of:

detecting that the audio drop is occurring in the received signal, in response to determining that the audio drop rate matches the threshold audio drop rate, and detecting that the audio drop is not occurring in the received signal, in response to determining that the audio drop rate does not match the threshold audio drop rate.

4. The method as claimed in claim 1, wherein generating, by the receiver device, the audio using the first spectrogram, the second spectrogram, the music feature, comprises:

concatenating, by the receiver device, the two spectrograms;

determining, by the receiver device, whether the concatenated spectrogram is equivalent to the spectrogram of the audio based on a real data set;

performing, by the receiver device, denoising, stabilization, synchronization and strengthening of the concatenated spectrogram using a neural network model, in response to determining that the concatenated spectrogram is equivalent to the spectrogram of the audio; and generating, by the receiver device, the audio from the concatenated spectrogram.

5. The method as claimed in claim 1, wherein the parameter associated with the received signal comprises at least one of a Signal Received Quality (SRQ), a Frame Error Rate (FER), a Bit Error Rate (BER), a Timing Advance (TA), and a Received Signal Level (RSL).

6. A system for managing an audio comprising:

a transmitter device and a receiver device, wherein the transmitter device comprising:

a first memory;

a first processor comprising processing circuitry; and a first audio and spectrogram controller comprising circuitry, coupled to the first memory and the first processor, the first audio and spectrogram controller configured to:

receive the audio to send to the receiver device, generate the spectrogram of the audio, identify a first spectrogram corresponding to vocals in the audio and a second spectrogram corresponding to music in the audio from the spectrogram of the audio using a neural network model, extract a music feature from the second spectrogram, and transmit a signal comprising the first spectrogram, the second spectrogram, the music feature and the audio to the receiver device, wherein the receiver device comprising:

a second memory;

a second processor comprising processing circuitry; and a second audio and spectrogram controller comprising circuitry, coupled to the second memory and the second processor, the second audio and spectrogram controller configured to:

receive a signal comprising a first spectrogram, a second spectrogram, a music feature and the audio from the transmitter device, wherein the first spectrogram corresponds to vocals in the audio and the second spectrogram corresponds to music in the audio, determine whether an audio drop is occurring and/or is predicted to occur in the received signal based on a parameter associated with the received signal, and generate the audio including the vocals and the music using the first spectrogram, the second spectrogram, the music feature, in response to determining that the audio drop is occurring and/or is predicted to occur in the received signal, wherein the music feature comprises at least one of texture, dynamics, octaves, pitch, beat rate, and key of the music in the audio, wherein generating, by the receiver device, the audio using the first spectrogram, the second spectrogram, the music feature, comprises:

generating, by the receiver device, encoded image vectors of the first spectrogram and the second spectrogram;

generating, by the receiver device, a latent space vector by sampling the encoded image vectors;

generating, by the receiver device, the audio based on the latent space vector and the music feature.

7. The system as claimed in claim 6, wherein the music feature comprises the texture, the dynamics, the octaves, the pitch, the beat rate, and the key of the music in the audio.

8. The system as claimed in claim 6, wherein determining whether the audio drop is occurring in the received signal based on the parameter associated with the received signal, comprises:

determining an audio data traffic intensity of the audio in the received signal;

detecting whether the audio data traffic intensity matches a threshold audio data traffic intensity;

predicting an audio drop rate by applying the parameter associated with the received signal to a neural network model;

determining whether the audio drop rate matches a threshold audio drop rate; and performing at least one of one of:

detecting that the audio drop is occurring in the received signal, in response to determining that the audio drop rate matches the threshold audio drop rate, and detecting that the audio drop is not occurring in the received signal, in response to determining that the audio drop rate does not match the threshold audio drop rate.

9. The system as claimed in claim 6, wherein generating the audio using the first spectrogram, the second spectrogram, the music feature, comprises:

concatenating the two spectrograms;

determining whether the concatenated spectrogram is equivalent to the spectrogram of the audio based on a real data set;

performing denoising, stabilization, synchronization and strengthening of the concatenated spectrogram using a neural network model, in response to determining that the concatenated spectrogram is equivalent to the spectrogram of the audio; and generating the audio from the concatenated spectrogram.

10. The system as claimed in claim 6, wherein the parameter associated with the received signal comprises at least one of a Signal Received Quality (SRQ), a Frame Error Rate (FER), a Bit Error Rate (BER), a Timing Advance (TA), and a Received Signal Level (RSL).

11. The method as claimed in claim 1, comprising converting, by the transmitter device, the spectrogram of the audio into a Mel-scale spectrogram, and wherein the first spectrogram corresponding to vocals in the audio and the second spectrogram corresponding to music in the audio is identified from the Mel-scale spectrogram of the audio using a neural network model.

* * * * *